United States Patent
Jha et al.

(10) Patent No.: US 10,019,262 B2
(45) Date of Patent: Jul. 10, 2018

(54) VECTOR STORE/LOAD INSTRUCTIONS FOR ARRAY OF STRUCTURES

(71) Applicant: Intel Corporation, Santa Clara, CA (US)

(72) Inventors: Ashish Jha, Portland, OR (US); Elmoustapha Ould-Ahmed-Vall, Chandler, AZ (US); Robert Valentine, Kiryat Tivon (IL); Mark J. Charney, Lexington, MA (US); Milind B. Girkar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 14/977,782

(22) Filed: Dec. 22, 2015

(65) Prior Publication Data
US 2017/0177340 A1    Jun. 22, 2017

(51) Int. Cl.
*G06F 9/30* (2018.01)
*G06F 9/345* (2018.01)

(52) U.S. Cl.
CPC ...... *G06F 9/30036* (2013.01); *G06F 9/30043* (2013.01); *G06F 9/30109* (2013.01); *G06F 9/3455* (2013.01)

(58) Field of Classification Search
None
See application file for complete search history.

(56) References Cited

U.S. PATENT DOCUMENTS

| | | | | |
|---|---|---|---|---|
| 4,811,213 A | * | 3/1989 | Takamine | G06F 15/8084 712/4 |
| 4,881,168 A | * | 11/1989 | Inagami | G06F 9/30043 708/520 |
| 2005/0102487 A1 | * | 5/2005 | Chatterjee | G06F 9/30014 712/2 |
| 2007/0011442 A1 | | 1/2007 | Hussain | |
| 2009/0172365 A1 | * | 7/2009 | Orenstien | G06F 9/30032 712/225 |
| 2011/0047360 A1 | * | 2/2011 | Maloney | G06F 9/30043 712/225 |
| 2014/0040599 A1 | | 2/2014 | Fleischer et al. | |
| 2014/0195775 A1 | | 7/2014 | Ould-Ahmed-Vall et al. | |
| 2014/0331032 A1 | | 11/2014 | Ahmed et al. | |
| 2015/0074354 A1 | | 3/2015 | Sprangle et al. | |
| 2015/0124910 A1 | * | 5/2015 | Van Kampen | G06F 15/8076 375/340 |

OTHER PUBLICATIONS

PCT, International Search Report and Written Opinion for PCT/US2016/063173, dated Mar. 7, 2017, 15 pages.

* cited by examiner

*Primary Examiner* — Eric Coleman
(74) *Attorney, Agent, or Firm* — Lowenstein Sandler LLP

(57) ABSTRACT

A processor comprises a plurality of vector registers, and an execution unit, operatively coupled to the plurality of vector registers, the execution unit comprising a logic circuit implementing a load instruction for loading, into two or more vector registers, two or more data items associated with a data structure stored in a memory, wherein each one of the two or more vector registers is to store a data item associated with a certain position number within the data structure.

20 Claims, 12 Drawing Sheets

VECTOR STORE/LOAD INSTRUCTIONS FOR ARRAY OF STRUCTURES

TECHNICAL FIELD

The present disclosure relates to processors of computers and, more specifically, to an instruction set architecture (ISA) employed by these processors.

BACKGROUND

An instruction set, or instruction set architecture (ISA), is part of the computer architecture related to programming of the computer. The programming may relate to different aspects of the computer, including the native data types associated with instructions, register architecture, addressing modes, memory architecture, interrupt and exception handling, and external input and output (I/O). It should be noted that the term instruction generally refers herein to macro-instructions implemented in logic circuitry in the form of dedicated execution units of the processor.

Programming languages (such as the C programming language) commonly include a structure data type that may further include data elements (such as variables) of the same data type or different data types. The type of data elements may include byte, word, double-word, and quad-word, whereas depending on implementations, the byte, word, double-word, and quad-word data element can include respective 8, 16, 32, and 64 bits. The data elements of the structure (also referred to as "data structure") may be accessed (e.g., read or write) through an identifier of the structure and an identifier for the data element within the structure. An array of structures (AoS) includes a collection of structures that may be identified according to an index of the array. Programs performing computation using AoS commonly involve accessing data elements of such arrays in a computational loop. The loop may include store operations that move data organized as AoS from registers to memory or load operations that move data associated with the AoS from memory to registers.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
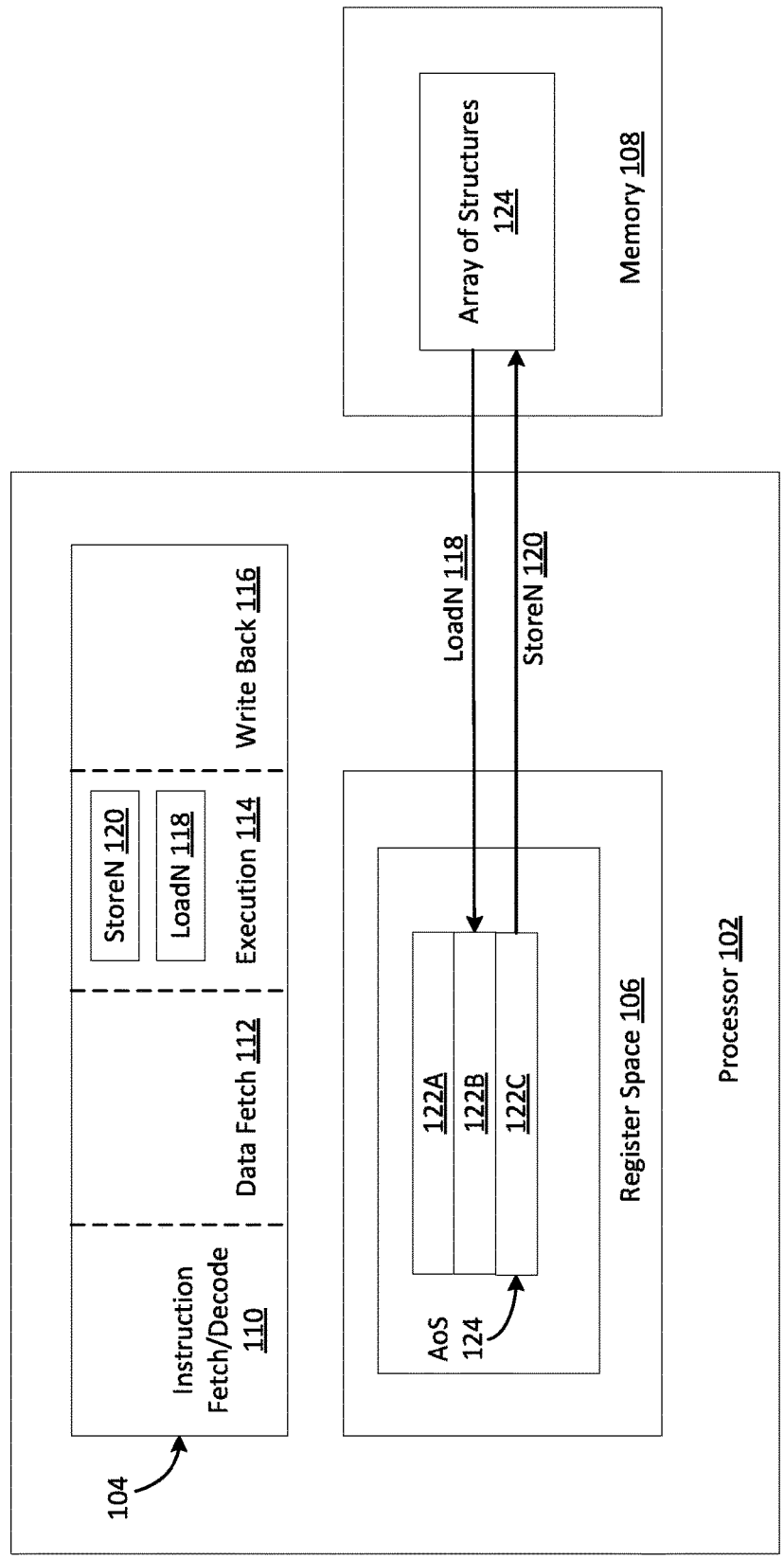
FIG. 1 illustrates a system-on-a-chip (SoC) including a processor 102 according to an embodiment of the present disclosure.

An AoS, as commonly defined and used in different programming languages, is a container object that contains a fixed number of same-type structure objects (referred to as "structure" herein). Each structure associated with the AoS may be identified by a unique index value through which it can be accessed. Each structure, as defined according to its type definition, may include data elements (e.g., variables) that may be accessed via data element identifiers. The AoS may be instantiated so that each data element associated with the AoS stores a data item, thus enabling organizing a collection of data items using the AoS. Computation employing the AoS commonly is performed on data items in a computation loop in which data items of each structure of the AoS undergo a same set of operations within the computation loop.

When stored in the memory, data items of the AoS are commonly arranged spatially such that data items belonging to a same structure (e.g., identified by a same index value) to be collocated next to each other. Thus, each data item within a structure may be associated with a position identifiable by a position number within the structure. However, during computation, these data items may need to be loaded into vector registers to be processed by vector instructions of a processor. A vector register is a wide register that can store more than one data item at register positions to be processed by an instruction of the processor. A register position is a logic location in the vector register to store one data item. The register position may be identified by a register position number (e.g., an offset or number of data items from a reference register position). In certain implementations of microprocessor architectures, a processor may be associated 32 vector registers, where each vector register may include 512 bits that can store multiple data items of certain lengths (e.g., 8, 16, 32, or 64 bit long). Each vector register stores data items belonging to a same data element across multiple structures associated with the AoS. Thus, the data items of an AoS that are stored adjacently in a vector register are not stored adjacently when stored in the memory if a structure of the AoS includes more than one data element. A stride is the memory position distance separating two data items in the memory that are stored adjacently in a vector register, where the memory position distance is the number of intermediate data items separating these two data items in the memory. Thus, data items of an AoS including structures having N data elements when stored in the memory may have a stride of N (e.g., N=2, 3, or 4).

For example, a structure including four elements (e.g., struct {double x, y, z, w} that may be associated with positions {0, 1, 2, 3}) is common in a wide range of high performance computation (HPC), graphics, and client applications. Thus, the machine code generated by a compiler may employ four gather instructions (such as vgatherdpd as specified in x86 ISA) whereas each of the four gather instructions is used to load data items associated with one data element of the AoS into a respective one of four vector registers (e.g., 256-bit vector registers, zmm0/1/2/3) that may each store eight items. Thus, the processor may execute 8*4=32 gather instructions to fully populate the four vector registers (e.g., zmm0/1/2/3) with data items associated from the memory, where each vector register stores data items with a certain position number of these structures retrieved. Similarly, when the processor attempts to store data items from vector registers (e.g., zmm0/1/2/3) into memory, the processor may need to execute 8*4 scatter instructions (vscatterdpd as specified in x86 ISA) to move all data items stored in the four vector registers into the memory. Therefore, there is a need for more efficient load instructions and store instructions for transferring data items (such as those associated with the AoS) between the memory and vector registers.

Embodiments of the present disclosure include processors employing an instruction set architecture (ISA) that includes a class of load instructions (represented by Load#N) and store instructions (represented by Store#N) that can efficiently transfer N (N>1) data items associated with an AoS between the memory and vector registers associated with the processors. Instead of loading each data item associated with the AoS sequentially into N vector registers using scalar load instructions, the Load#N instruction (where N is an integer greater than one) may load N data items belonging to one data element of the AoS into N vector registers concurrently, thus reducing the number of load operations to fully populate N vector registers. Similarly, instead of storing each data item associated with the AoS sequentially from N vector registers using scalar store instructions, the Store#N instruction (where N is an integer greater than one) may store N data items belonging to one data element of the AoS and stored across N registers concurrently into the memory, thus reducing the number of store operations to transfer these data items to the memory.

FIG. 1 illustrates a system-on-a-chip (SoC) 100 including a processor 102 according to an embodiment of the present disclosure. Processor 102 may include logic circuitry fabricated on a semiconductor chipset such as SoC 100. Processor 100 can be a central processing unit (CPU), a graphics processing unit (GPU), or a processing core of a multi-core processor. As shown in FIG. 1, processor 102 may include an instruction execution pipeline 104 and a register space 106. Further, processor 102 may be operably coupled to memory 108 that may store data items associated with an AoS. Pipeline 104 is a logic circuit that may include multiple pipeline stages, and each stage includes logic circuitry fabricated to perform a specific step in a multi-step process needed to fully execute an instruction specified in an instruction set architecture (ISA) of processor 102. In one embodiment, pipeline 104 may include an instruction fetch/decode stage 110, a data fetch stage 112, an execution stage 114, and a write back stage 116.

Register space 106 is a logic circuit area including different types of registers associated with processor 102. In one embodiment, register space 106 may include a set of vector registers 122A through 122C that each may include a certain number (referred to as the "length") of bits to store data items processed by instructions executed in pipeline 104. Depending on implementations, the set of vector registers 122A-122C can include up to a maximum number (e.g., 32) of vector registers. For example, depending on implementations, vector registers 122A-122C can be 64-bit, 128-bit, 256-bit, or 512-bit vector registers. Each vector register 122A-122C may store one or more data items. In one embodiment, processor 102 may a single-instruction-multiple-data (SIMD) processor, namely processor 102 may execute one instruction to process multiple data items stored in vector registers 122A-122C.

The source code of a program may be compiled into a series of machine-executable instructions defined in an instruction set architecture (ISA) associated with processor 102. When processor 102 starts to execute the executable instructions, these machine-executable instructions may be placed on pipeline 104 to be executed sequentially. Instruction fetch/decode stage 110 may retrieve an instruction placed on pipeline 104 and determine an identifier associated with the instruction. The instruction identifier may associate the received instruction with one specified in the ISA of processor 102.

Certain instructions specified in the ISA may be designed to transfer data items between vector registers 122A-122C and memory 108. Data fetch stage 112 may retrieve, from register space 106, data items associated with the AoS to be processed. Execution stage 114 may include logic circuitry to execute instructions specified in the ISA of processor 102.

In one embodiment, the logic circuitry associated with execution stage 114 may include multiple "execution units" (or functional units), each execution unit including logic circuitry dedicated to perform one respective instruction. The collection of all instructions performed by these execution units may constitute the instruction set associated with processor 102. In response to executing an instruction to process data items retrieved by data fetch stage 112, write back stage 116 may output the results in register space 106.

In one embodiment, the ISA associated with processor 102 may include a class of load instructions (Load#N 118) and a class of store instruction (Store#N 120). Load#N 118 instructions that, when executed, may transfer data items from memory 108 to vector registers 122A-122C, whereas N is an integer that is greater than one and indicates the number (also referred to as the "stride" because it is the same as the stride of data items stored in the memory) of vector registers used to load data elements. Store#N 120 instructions, when executed, may transfer data items from vector registers 122A-122C to memory 108.

The number N can be an integer number that is greater than 1. For example, the class of Load#N can include a Load3 instruction, and a Load4 instruction. The execution stage 114 of processor 102 may include a Load#N execution unit 118 to correspondingly include a first logic circuitry fabricated to perform the function of the Load3 instruction and a second logic circuitry fabricated to perform the Load4 instruction. The Load#N instructions, when executed using Load#N execution unit 118, may transfer N data items associated with an AoS from a memory location concurrently to N vector registers 122A-122C associated with processor 102.

Similarly, the ISA of processor 102 may also include a class of Store#N instructions. For example, the class of Store#N can include a Store3 instruction, and a Store4 instruction. The execution stage 114 of processor 102 may include a Store#N execution unit 118 to correspondingly include a first logic circuitry fabricated to perform the Store3 instruction and a second logic circuitry fabricated to perform the Store4 instruction. The Store#N instructions, when executed using Store#N execution unit 118, may transfer N data items concurrently from N vector registers 122A-122C associated with processor 102 to a memory location.

Figure 2:
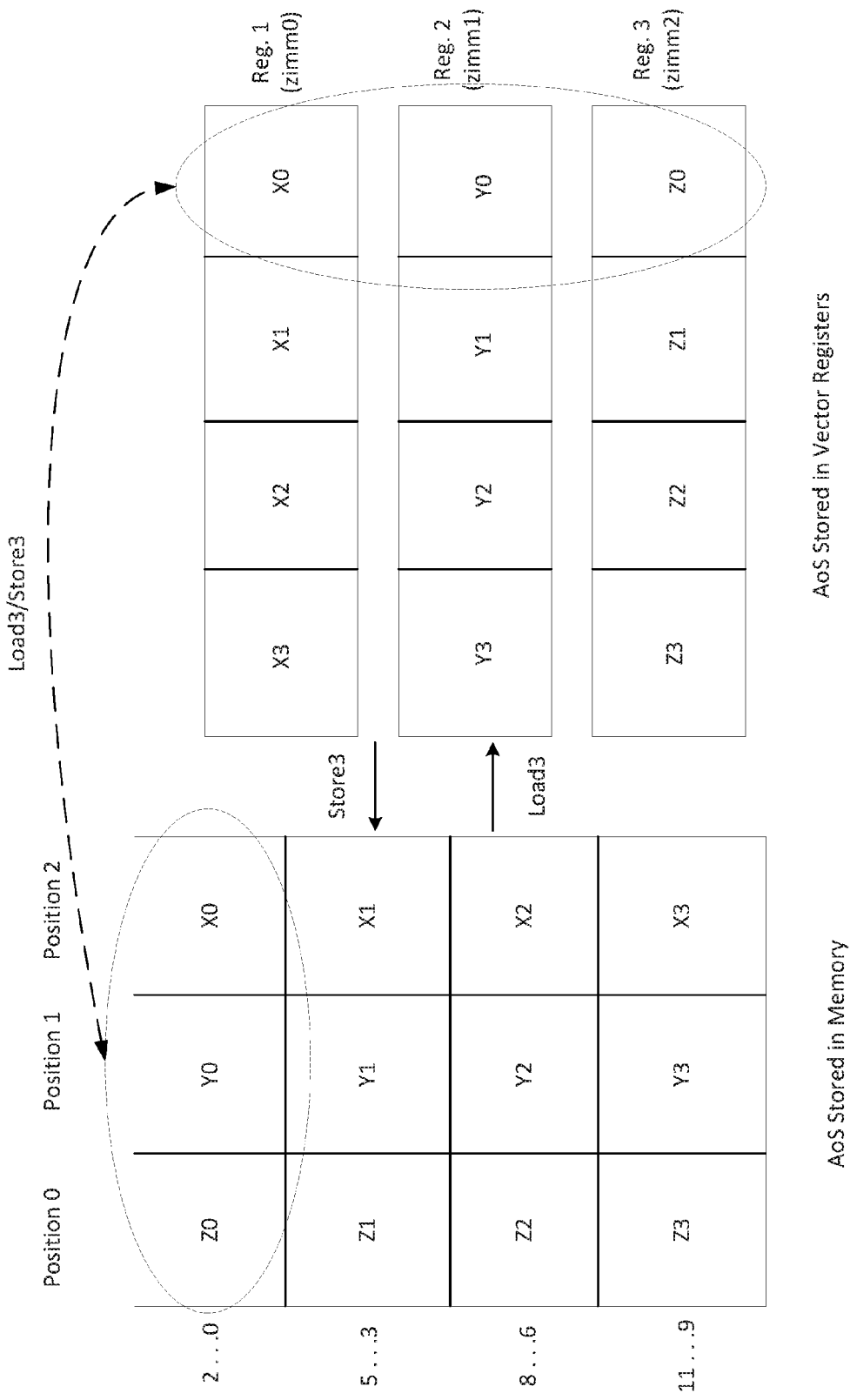
FIG. 2 illustrates exemplary operations of Load3 and Store3 instructions according to an embodiment of the present disclosure.

FIG. 2 illustrates exemplary operations of Load3 and Store3 instructions according to an embodiment of the present disclosure. An structure type may be defined in a program as follows:

Struct DataStructureType {
double x, y, z
}, where the language construct describes a data structure including three data elements of double type. An array of structures (AoS) of 100 structures may be instantiated using the structure type definition as follows:

DataStructureType ArrayOfStructure[100], where the ArrayOfStructure[100] is an array that includes 100 structure instances each being defined according to the DataStructureType, and each structure includes three data items of double precision (i.e., x, y, and z). The double-precision data items may each be represented by a number of bytes. For example, in some implementations, a double data element may occupy eight bytes of memory space.

Referring to FIG. 2, in one embodiment, data items associated with ArrayOfStructure may have been stored in a memory associated with the processor. In the memory, data items associated with ArrayOfStructure may be arranged consecutively from a starting memory location (e.g., location 0) in an order according to the array index. Each memory location stores one data item. Thus, data items (x0, y0, z0) associated with ArrayOfStructure[0] may be stored at memory locations 0-2, where each memory location may be associated with a four-byte memory space; data items (x1, y1, z1) associated with ArrayOfStructure[1] may be stored at memory locations 3-5, and so on. Load3 instruction may load data items from these memory locations to vector registers associated with the processor. Instead of loading data items in an order according to the data element (namely loading each of x data items (x0, x1, x2, x3) into vector register 1; then loading each of y data items (y0, y1, y2, y3) into vector register 2; and then loading each of z data items (z0, z1, z2, z3) into vector register 3), the execution of the Load3 instruction is to concurrently load all data elements associated with one structure of ArrayOfStructure into three vector registers, where each of the three vector registers stores respective one data item.

In one embodiment, processor may be associated with a set of vector registers (e.g., 32 vector registers) that are identified by an alphabet identifier followed by a numeral identifier. For example, in x86 AVX architecture, vector registers may be named as zimm0, zimm1, . . . , zimm#M, where zimm is the name of the vector registers and #M is the numeral identifier used to identify the logic order of these vector registers. The Load3 instruction may be called in the following form: "Load3 StartVectorReg StartMemoryLocation", where StartVectorReg specifies the first vector register (e.g., zimm0) to receive data from the memory, and StartMemoryLocation specifies a starting memory location at which stores the head of a sequence of data items to be loaded into the vector registers. The number 3 identifies the stride of data items stored in the memory and thus three vector registers starting from zmm0 that are used to receive data items. Thus, when called as Load3 zimm0 memory0, Load3 instruction may, at each execution, load the three data items associated with one structure of ArrayOfStructure into three corresponding locations in zimm0-zimm2.

In the example as shown in FIG. 2, data items {x0, y0, z0} associated with positions {0, 1, 2} of structure ArrayOfStructure[0] stored in memory locations 0-2 may be loaded into the respective first positions of vector registers zimm0-zimm2, data items {x1, y1, z1} associated with positions {0, 1, 2} of structure ArrayOfStructure[1] stored in memory locations 3-5 may be loaded into the respective second positions of vector registers zimm0-zimm2, and so on until zimm0-zimm2 are filled with data items. In response to filling up vector registers zimm0-zimm2, if there are more data items to be loaded into vector registers, Load3 instruction may further load data items into the vector registers next in the order or zimm3-zimm5. Thus, the data items associated with ArrayOfStructure[100] may be loaded into vector registers by executing Load3 instruction 100 times, rather than executing 3*100=300 scalar gather instructions.

Conversely, Store3 instructions may be executed to transfer data items associated with ArrayOfStructure stored in vector registers into memory locations. Each vector register may have been used to store data items associated with one data elements of an AoS. For example, as shown in FIG. 2, a first vector register (zimm0) may store data items x0-x3, a second vector register (zimm1) may store data items y0-y3, and a third vector register (zimm2) may store data items z0-z3, where each data item may be a double type that occupies eight bytes in vector registers zimm0-zimm2. Store3 instruction may store data items from vector registers associated with the processor to memory locations. Instead of storing data items in an order according to the data element linked to each vector register (e.g., x0-x3, then y0-y3, and then z0-z3), the execution of the Store3 instruction can concurrently store the three data items associated with one structure of ArrayOfStructure from three vector registers into memory locations.

The Store3 instruction may be called in the following form: "Store3 StartMemoryLocation StartVectorReg", where StartVectorReg specifies the first vector register (e.g., zimm0) storing data items associated with ArrayOfStructure, and StartMemoryLocation specifies a starting memory location at which stores the head of data items to be stored in the memory. Thus, when called as Store3 memory0 zimm0, Store3 instruction may, at each execution, store the three data items associated with one structure of ArrayOfStructure from three corresponding locations in zimm0-zimm2 into the memory. In the example as shown in FIG. 2, data items {x0, y0, z0} of structure ArrayOfStructure[0] stored in the respective first positions of vector registers zimm0-zimm2 may be stored in memory locations 0-2, data items {x1, y1, z1} of structure ArrayOfStructure[1] stored in the respective second positions of vector registers zimm0-zimm2 may be stored in memory positions 3-5, and so on until data items in zimm0-zimm2 are all stored in the memory. At that point, if there are more data items to be stored into the memory, Store3 instruction may further store data items from zimm3-zimm5 into the memory.

FIG. 2 is an illustrative, non-limiting example for Load#N and Store#N instructions when N=3. Embodiments of the present disclosure may include Load#N and Store#N instructions where N is an integer other than 3. In some embodiments, N can be 2 or 4. Thus, execution unit 114 of processor 102 may include logic circuitries correspondingly to perform Load2, Load3, Load4, Store2, Store3, and Store4 instructions defined in the ISA employed by processor 102.

In one embodiment, different types of the Load#N and Store#N instructions may be further specified according to the data type of data elements associated with the AoS. In one embodiment, the data element type can be any one of byte (B), word (W), double-word (D), or quad-word (Q), where a byte includes 8 bits, word may, depending on the architecture design, include 16 bits, double-word may include 32 bits, and quad-word may include 64 bits. Thus, the Load#N and Store#N instructions may be further specified as Load#N{B/W/D/Q} and Store#N{B/W/D/Q}, where N is the stride, B represents byte data type, W represents word data type, D represents double-word data type, and Q represents quad-word data type. Exemplary load and store instructions may include "Load2B," "Load2 W," "Load2D," "Load2Q," "Store2B," "Store2 W," "Store2D," "Store2Q," etc. The stride length N is related to the number of data elements defined in data structure type (thus, the number of vector registers used to store data items), and the type of data elements (B/W/D/Q) determines the number of bits that each data item occupies in the vector registers.

Figure 3:
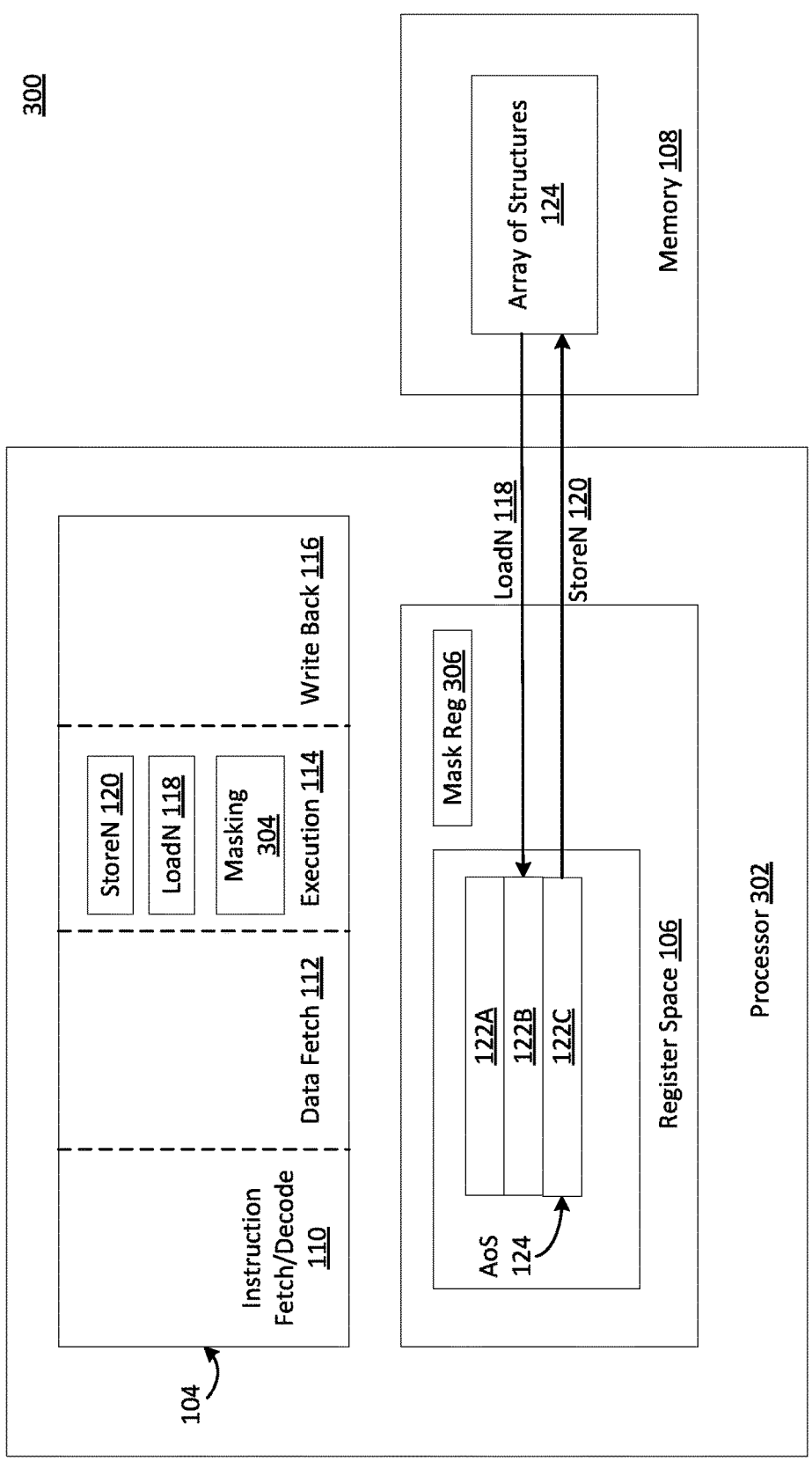
FIG. 3 illustrates a system-on-a-chip (SoC) including a processor 302 with masking logic according to another embodiment of the present disclosure.

In some embodiments, Load#N instructions may load data items into permissible positions in vector registers from memory, and Store#N instructions may store data items from permissible positions in vector registers into the memory. FIG. 3 illustrates a system-on-a-chip (SoC) 300 including a processor 302 with masking logic according to another embodiment of the present disclosure. Processor 302 as shown in FIG. 3 includes all components as processor 102 described in conjunction with FIG. 1. In one embodiment, the execution units of processor 302 may further include a masking logic unit 304 to block certain positions of vector registers 112A-122C based on a mask. Each bit of the mask may correspond to a respective data position of vector registers 122A-122C that stores one data item. Thus, data positions of a vector register may include a series of index values that each may correspond to a position to store one data item. Thus, a binary value may be used to indicate whether a data position in the vector register is blocked. For example, a binary value "0" (or conversely, "1") may indicate blocked, and a binary value "1" (or conversely "0") may indicate not-blocked. In one embodiment, register space 302 may include one or more mask registers 306 to store certain masks applicable to Load#N and Store#N instructions. Each mask register 306 may be a specific or general purpose register that stores the binary values of a mask. In another embodiment, the mask may be directed supplied to Load#N and Store#N instructions as a command line input.

Load#N and Store#N instructions may be augmented with the mask to indicate that certain data positions of vector registers 122A-122C are blocked according to the mask. In one embodiment, a load instruction with masking may have the following format: "Load#N StartVectorReg StartMemoryLocation MaskReg," where StartVectorReg denotes the starting vector register to receive data items, StartMemoryLocation represents the memory position of the head of a sequence of data items to be loaded into the vector registers, and MaskReg is the register that stores the mask. During execution, Load#N instruction first checks the mask to determine whether the data position of the vector register is blocked. If it is not blocked, Load#N retrieves N data items from the memory and loads into the data position in N vector registers. If it is blocked, Load#N moves on to next N data items and next vector register position without loading data items into the block position; thus, the content of the vector registers at that data position may be preserved.

Similarly, a store instruction with masking may have the following format: "Store#N StartMemoryLocation StartVectorReg MaskReg," where StartVectorReg denotes the starting vector register to retrieve data items, StartMemoryLocation represents the memory position to store the head of a sequence of data items from the vector registers, and MaskReg is the register that stores the mask. During execution, Store#N instruction first checks the mask to determine whether the data position of vector registers is blocked. If it is not blocked, Store#N retrieves N data items from the N vector registers and stores into the memory. If it is blocked, Store#N moves on to next vector register position without storing data items into the memory.

Figure 4:
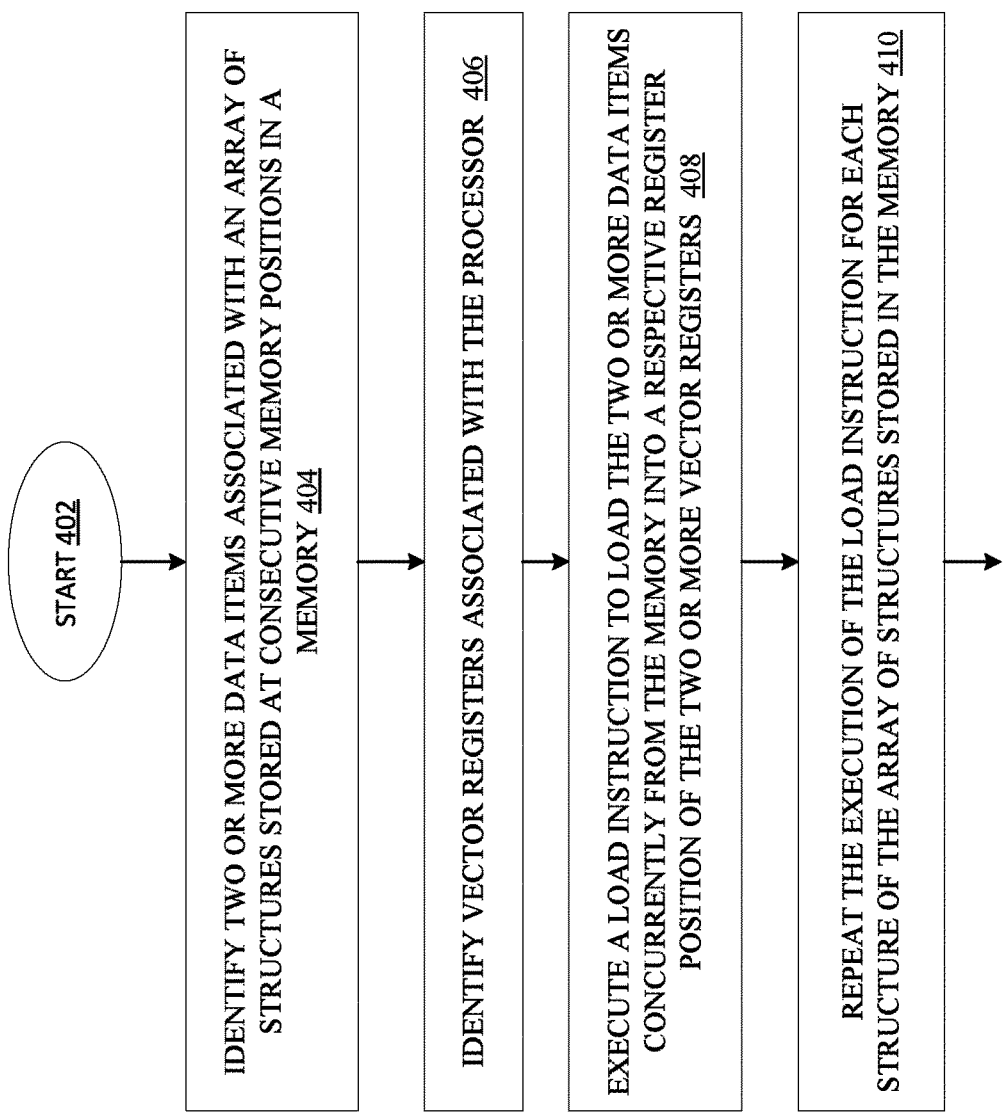
FIG. 4 is a block diagram of a method to load AoS from a memory to registers according to an embodiment of the present disclosure.

FIG. 4 is a block diagram of a method 400 to load AoS from a memory to registers according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 as shown in FIG. 1 and processor 302 as shown in FIG. 3.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, the processor may start the execution of a computation loop to load an AoS stored in a memory associated with the processor to vector registers associated with the processor.

At 404, the processor may identify two or more data items associated with an AoS, wherein the two or more data items may be stored in consecutive memory positions in the memory.

At 406, the processor may identify vector registers that may receive the two or more data items loaded from the memory. These vector registers may be organized in an ordered sequence and identified by an alphabetic string with a numeral suffix, such as the zimm0-zimm32 vector registers specified in x86 AVX micro architectures.

At 408, the processor may execute a Load#N instruction that is defined in the ISA employed by the processor. The execution of the Load#N instruction may specify N vector registers from the identified vector registers and specify the memory location at which data items associated with the AoS are stored in the memory. Thus, the execution of the Load#N instruction may load N the two or more data items from the memory location to N vector registers, wherein each of the N vector registers stores a respective one data item.

At 410, in response to loading the N data items, the processor may update the memory position to the next N data items stored in the memory (e.g., by moving up N memory positions) and repeat the execution of the Load#N instruction to load N data items associated with the next structure of the AoS to the next data position in the N vector registers. This process may be repeated until data items associated with all structures in the AoS are loaded into the vector registers.

Figure 5:
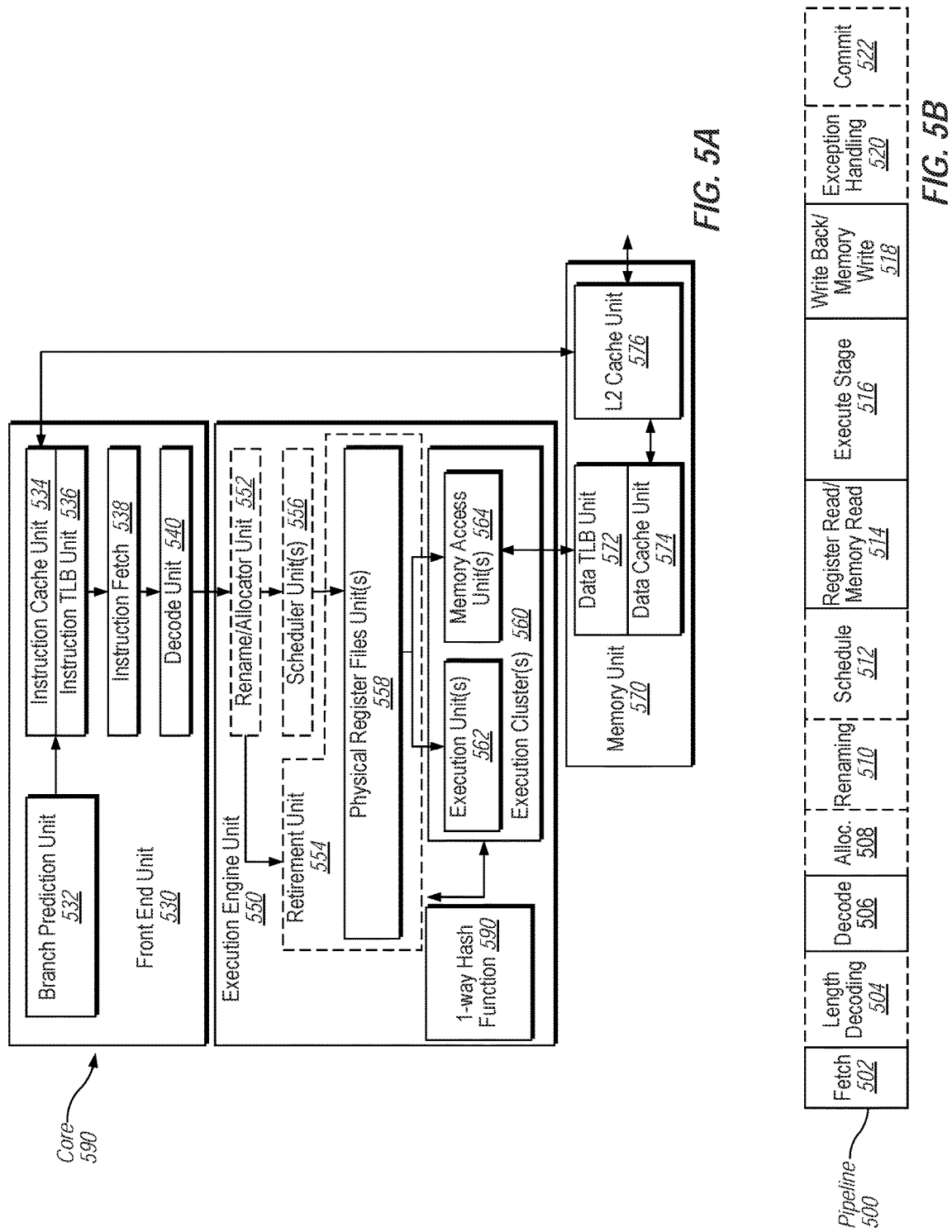
FIG. 5A is a block diagram illustrating a micro-architecture for a processor including heterogeneous core in which one embodiment of the disclosure may be used.
FIG. 5B is a block diagram illustrating an in-order pipeline and a register renaming stage, out-of-order issue/execution pipeline implemented according to at least one embodiment of the disclosure.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
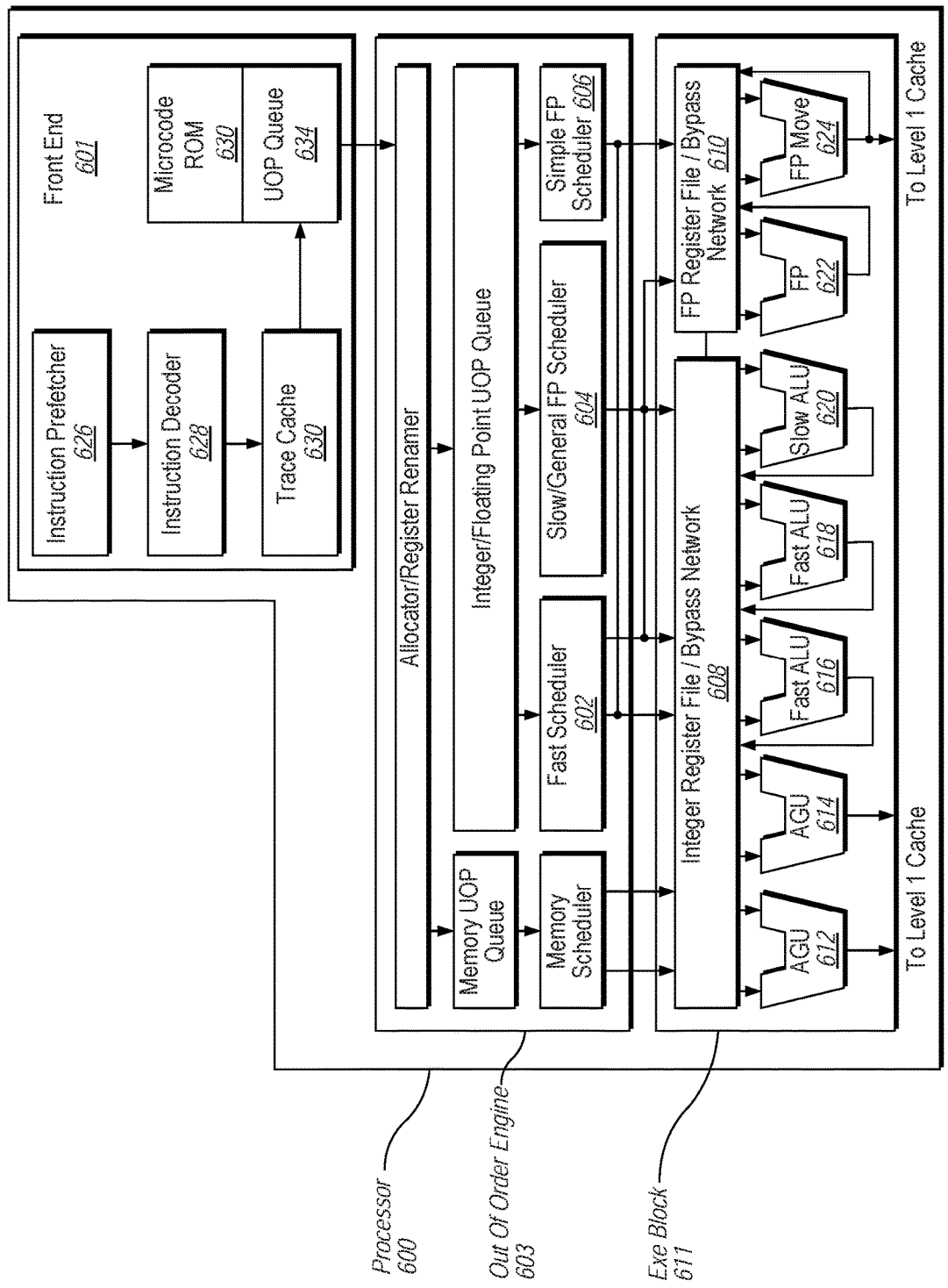
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
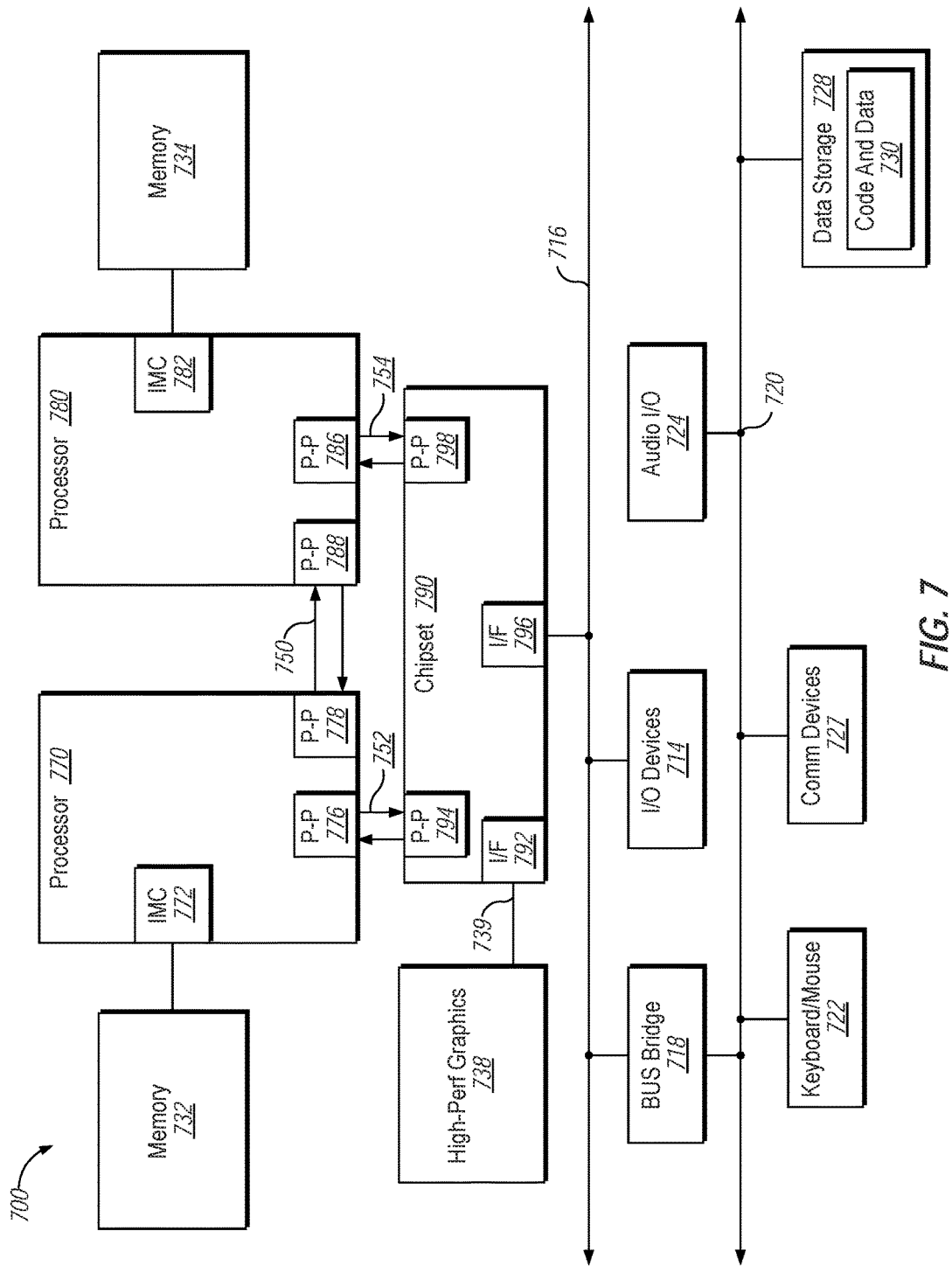
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
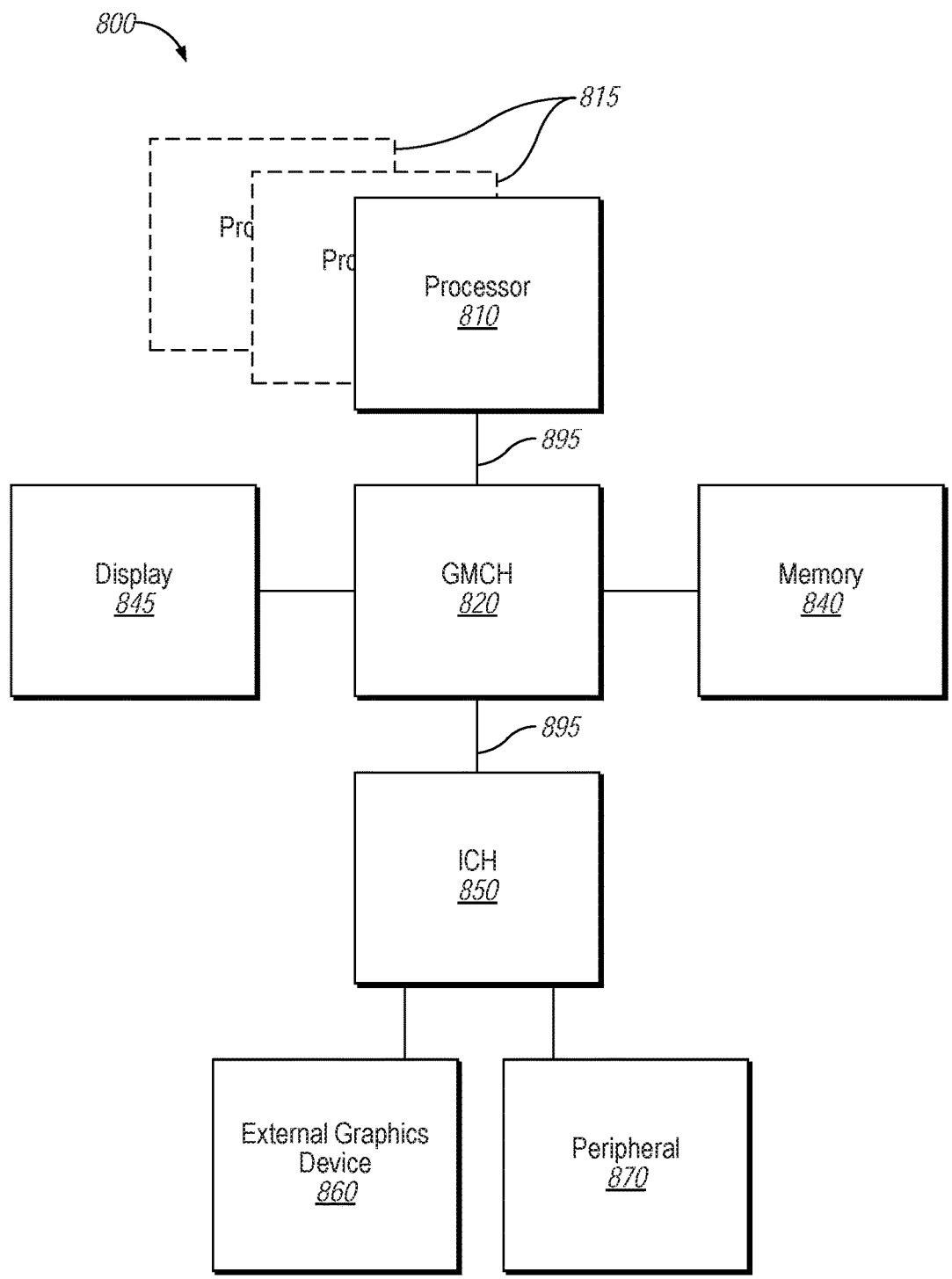
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
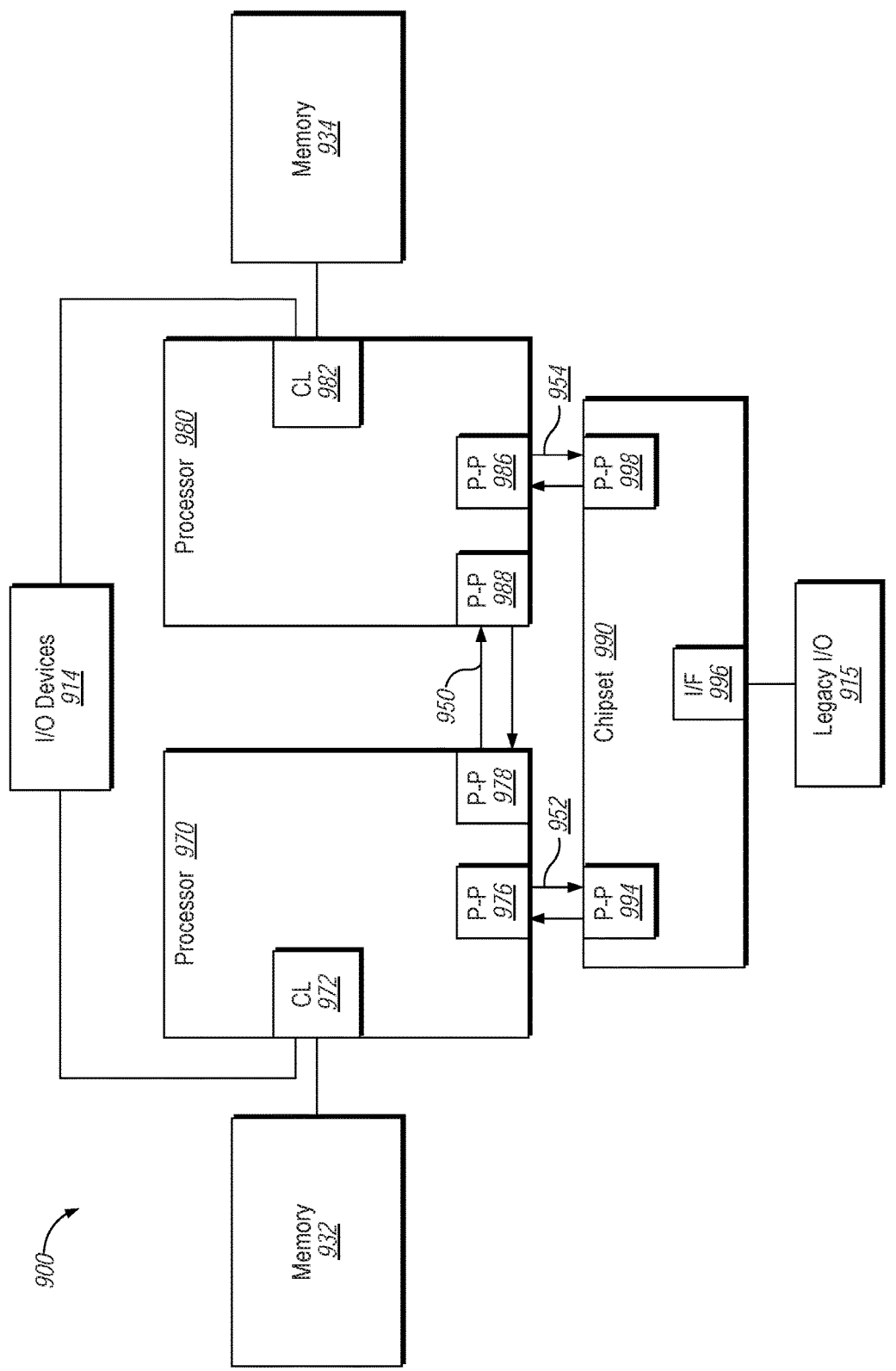
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
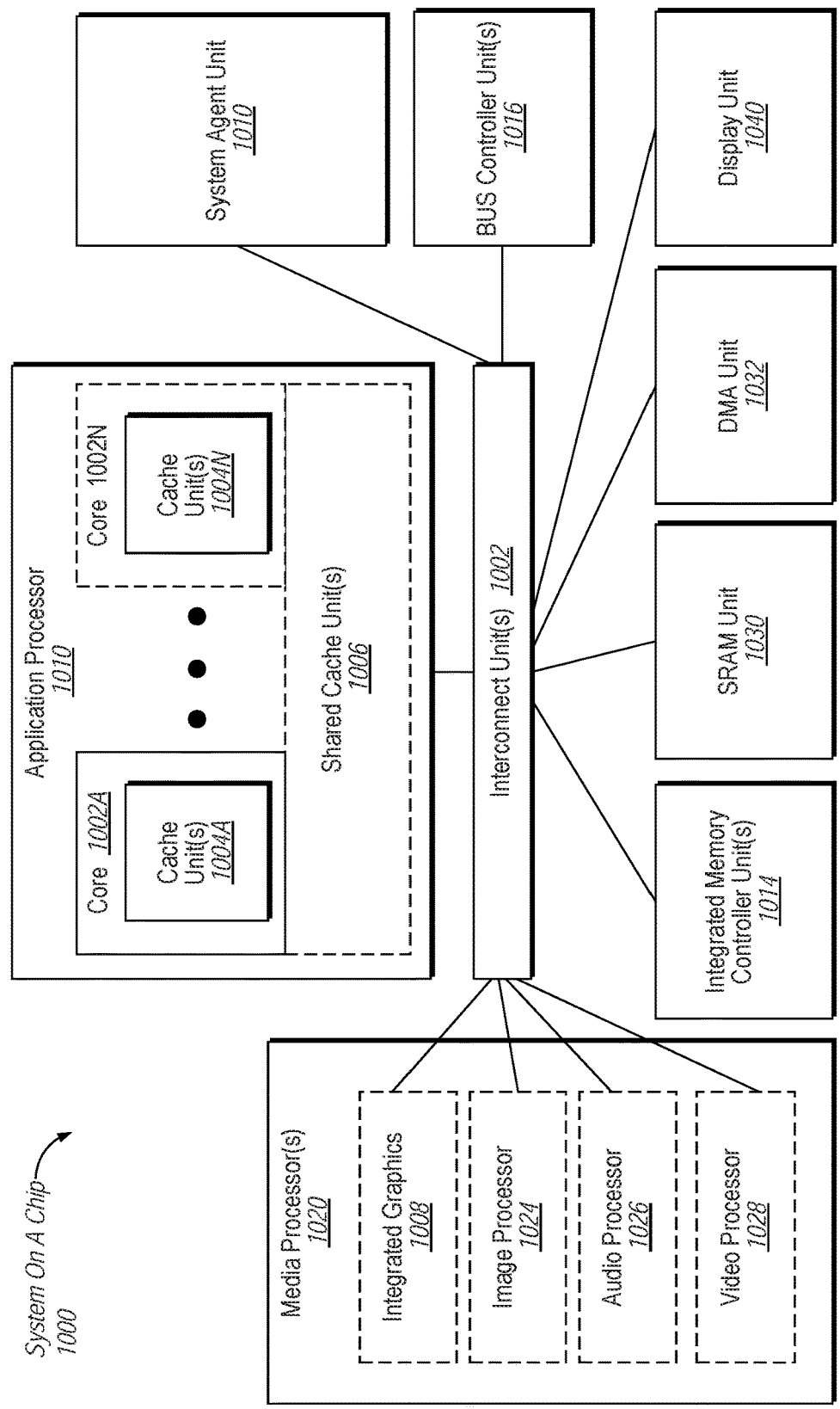
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
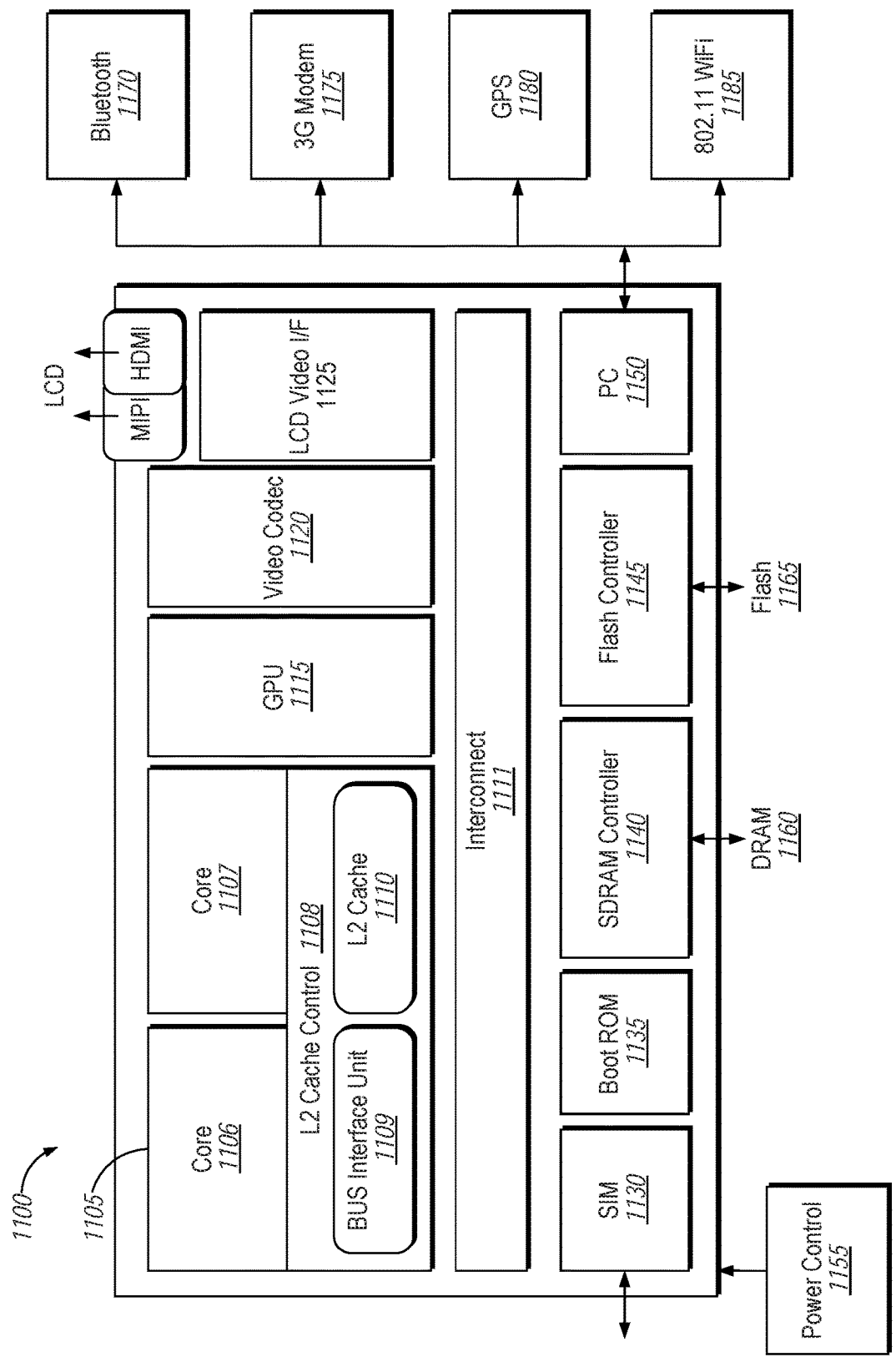
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
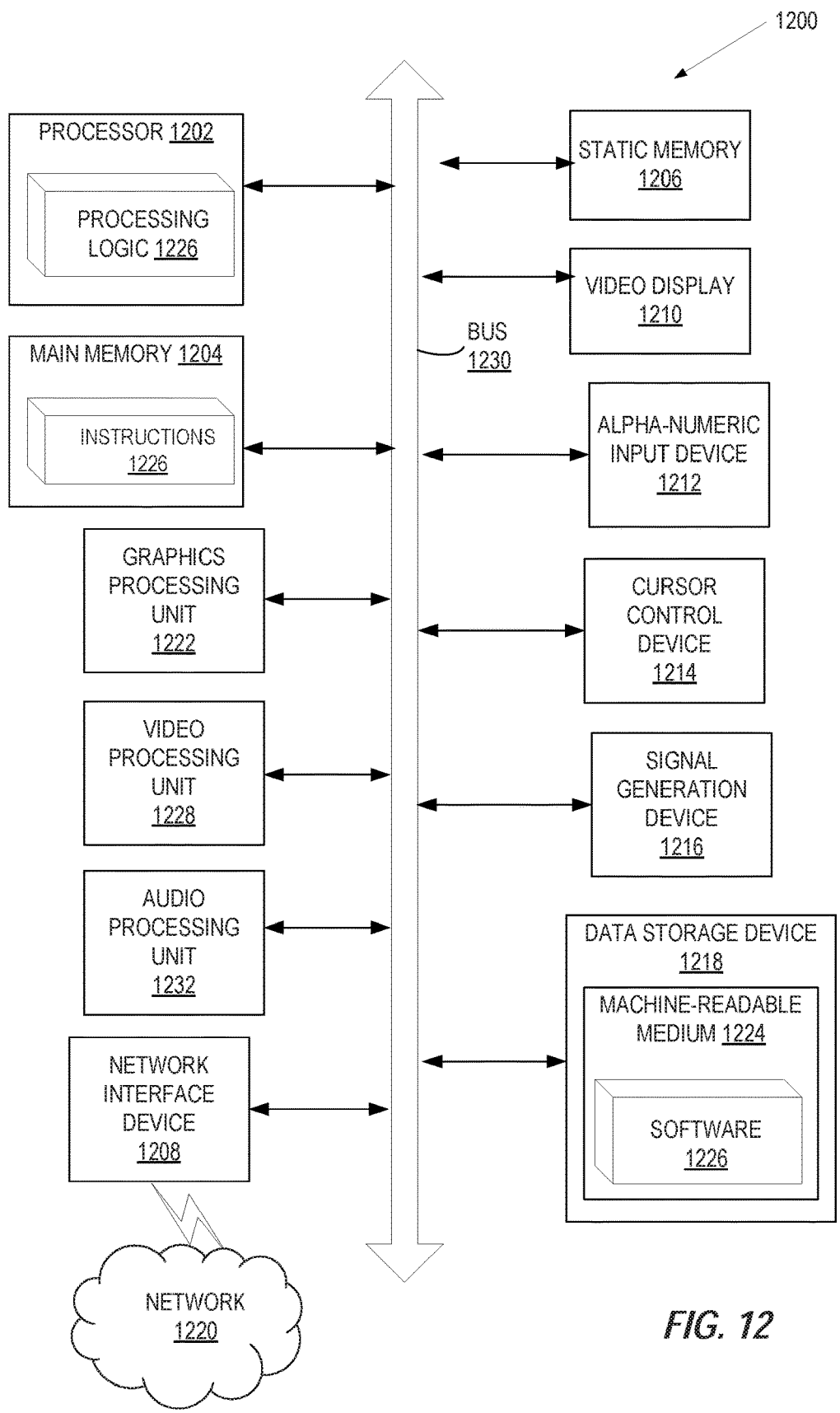
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including a plurality of vector registers, and an execution unit, operatively coupled to the plurality of vector registers, the execution unit comprising a logic circuit implementing a load instruction for loading, into two or more vector registers, two or more data items associated with a data structure stored in a memory, wherein each one of the two or more vector registers is to store a data item associated with a certain position number within the data structure.

In Example 2, the subject matter of Example 1 can further provide that each one of the plurality of vector registers comprises a plurality of register positions to store a plurality of data items, and wherein each register position of a vector register is identified by a register position number.

In Example 3, the subject matter of any of Examples 1 and 2 can further provide that the logic circuit is to execute the load instruction to load the two or more data items into a respective register position associated with a same register number within the two or more vector registers.

In Example 4, the subject matter of Example 1 can further provide that the logic circuit is to execute the load instruction to load the two or more data items concurrently into the two or more vector registers.

In Example 5, the subject matter of Example 1 can further provide that the memory stores an array of structures comprising a plurality of data structures, and wherein the processor is to repeatedly execute the load instruction to load the plurality of data structures into the two or more vector registers.

In Example 6, the subject matter of any of Examples 1 and 5 can further provide that each execution of the load instruction loads, into the two or more vector registers, two or more data items associated with a respective one of the plurality of data structures.

In Example 7, the subject matter of Example 6 can further provide that each one of the two or three vector registers is to store a plurality of data items associated with a same position number within the plurality of data structures.

In Example 8, the subject matter of Example 1 can further include a masking logic and a mask register to store a bit map, wherein each bit in the bit map is to denote a masking flag associated with a register position of the plurality of vector registers, in which the logic circuit implementing the load instruction is to, responsive to determining that the masking flag represents a blocking status, refrain from executing the load instruction for loading the two or more data items into the two or more vector registers.

Example 9 is a processor including a plurality of vector registers and an execution unit, operatively coupled to the plurality of vector registers, the execution unit comprising a logic circuit implementing a store instruction for storing, into a memory, two or more data items associated with a data structure stored in two or more vector registers, wherein each one of the two or more vector registers stores a data item associated with a certain position number within the data structure.

In Example 10, the subject matter of Example 9 can further provide that each one of the plurality of vector registers comprises a plurality of register positions to store a plurality of data items, and wherein each register position of a vector register is identified by a register position number.

In Example 11, the subject matter of any of Examples 9 and 10 can further provide that each one of the plurality of vector registers comprises a plurality of register positions to store a plurality of data items, and wherein each register position of a vector register is identified by a register position number.

In Example 12, the subject matter of Example 9 can further provide that the logic circuit is to execute the store instruction to store the two or more data items concurrently into the memory.

In Example 13, the subject matter of Example 9 can further provide that the two or more vector registers stores a plurality of data structures, wherein each one of the two or three vector registers stores a plurality of data items associated with a same position number within the plurality of data structures, and wherein the processor is to repeatedly execute the store instruction to store the plurality of data structures into the memory.

In Example 14, the subject matter of Example 9 can further include a masking logic, and a mask register to store a bit map, wherein each bit in the bit map is to denote a masking flag for a register position in the plurality of vector register, in which the logic circuit implementing the store instruction is to, responsive to determining that the masking flag represents a blocking status, refrain from executing the store instruction for storing the two or more data items into the memory.

Example 15 is a system-on-a-chip (SoC) including a memory, a plurality of vector registers, and a first execution unit, operatively coupled to the plurality of vector registers, the first execution unit comprising a first logic circuit implementing a load instruction for loading, into two or more vector registers, two or more data items associated with a data structure stored in a memory, wherein each one of the two or more vector registers is to store a data item associated with a certain position number within the data structure.

In Example 16, the subject matter of Example 15 can further include a second execution unit comprising a second logic circuit implementing a store instruction for storing, into the memory, the two or more data items associated with the data structure stored in the two or more vector registers.

In Example 17, the subject matter of any of Examples 15 and 16 can further include a masking logic and a mask register to store a bit map, wherein each bit in the bit map it to denote a masking flag for a register position in the plurality of vector register.

In Example 18, the subject matter of Example 17 can further provide that the first logic circuit implementing the load instruction is to responsive to determining that the masking flag represents a blocking status, refrain from executing the load instruction for loading the two or more data items into the two or more vector registers.

In Example 19, the subject matter of Example 17 can further provide that the second logic circuit implementing the store instruction is to responsive to determining that the masking flag represents a blocking status, refrain from executing the store instruction for storing the two or more data items into the memory.

Example 20 is a method including identifying, by a processor, two or more data items associated with an array of structures stored at consecutive memory positions in a memory, identifying two or more vector registers associated with the processor, and executing a load instruction, implemented in an execution unit of the processor, to load the two or more data items concurrently from the memory into a respective register position within the two or more vector registers, wherein a respective one of the two or more data items is stored in a respective one of the two or more vector registers.

In Example 21, the subject matter of Example 20 can further include prior to executing the load instruction, checking a masking flag stored in a mask register to determine whether the respective register position is blocked, and responsive to determining that the mask flag indicates that the respective register position is blocked, refraining from executing the load instruction.

Example 22 is an apparatus including means for performing the method of any of Examples 20 and 21.

Example 23 is a machine-readable non-transitory medium having stored thereon program code that, when executed, perform operations including identifying, by a processor, two or more data items associated with an array of structures stored at consecutive memory positions in a memory, identifying two or more vector registers associated with the processor, and executing a load instruction, implemented in an execution unit of the processor, to load the two or more data items concurrently from the memory into a respective register position within the two or more vector registers, wherein a respective one of the two or more data items is stored in a respective one of the two or more vector registers.

In Example 24, the subject matter of Example 23 can include prior to executing the load instruction, checking a masking flag stored in a mask register to determine whether the respective register position is blocked, and responsive to determining that the mask flag indicates that the respective register position is blocked, refraining from executing the load instruction.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a plurality of vector registers comprising at least a first vector register and a second vector register; and
   an execution unit, operatively coupled to the plurality of vector registers, the execution unit comprising a logic circuit to execute a load instruction to load, into the first vector register and the second vector register, at least a first data item and a second data item, respectively, which are located at consecutive position numbers within a data structure stored in a memory, wherein the consecutive position numbers comprise a first position number and a second position number.

2. The processor of claim 1, wherein each one of the first vector register and the second vector register comprises a plurality of register positions to store a plurality of data items, and wherein each register position of the first vector register and the second vector register is identified by a register position number.

3. The processor of claim 2, wherein the logic circuit is further to execute the load instruction to load the first data item into a first register position of the first vector register and the second data item into the first register position of the second vector register.

4. The processor of claim 1, wherein the logic circuit is further to execute the load instruction to concurrently load the first data item into the first vector register and the second data item into the second vector register.

5. The processor of claim 1, wherein the data structure stored in the memory is one of a plurality of data structures of an array of structures stored in the memory, and wherein the processor is to repeatedly execute the load instruction to load, in turn, data items located at the first position number and the second position number of each of the plurality of data structures into the first vector register and the second vector register, respectively.

6. The processor of claim 5, wherein the first vector register is to consecutively store the data items located at the first position number in the plurality of data structures, and the second vector register is to consecutively store the data items located at the second position number in the plurality of data structures.

7. The processor of claim 1, further comprising a mask register to store a bit map, wherein each bit in the bit map is to denote a masking flag associated with a register position of one of the plurality of vector registers, wherein the logic circuit is further to execute the load instruction to, responsive to a determination that the masking flag represents a blocking status associated with a first register position of the first vector register, not load the first data item into the first vector register.

8. A processor comprising:
   a plurality of vector registers comprising at least a first vector register and a second vector register; and
   an execution unit, operatively coupled to the plurality of vector registers, the execution unit comprising a logic circuit to execute a store instruction to store, into a memory, at least a first data item and a second data item associated with a data structure, the first data item being resident in a first register position of the first vector register and the second data item being resident in the first register position of the second vector register, wherein the first data item and the second data item are to be located at consecutive position numbers within the data structure as stored in the memory.

9. The processor of claim 8, wherein each one of the first vector register and the second vector register comprises a plurality of register positions to store a plurality of data items, and wherein each register position of the first vector register and the second vector register is identified by a register position number.

10. The processor of claim 9, wherein the logic circuit is to further execute the store instruction to retrieve the first data item from the first register position of the first vector register and to retrieve the second data item from the first register position of the second vector register, wherein the first register position is associated with an identical register number of the first vector register and the second vector register.

11. The processor of claim 8, wherein the logic circuit is further to execute the store instruction to store the first data item and the second data item concurrently into the memory.

12. The processor of claim 8, wherein the first vector register and the second vector register are to store a plurality of data structures of an array of structures, wherein each of the first vector register and the second vector register stores a plurality of data items associated with an identical position number within the plurality of data structures, and wherein the processor is to repeatedly execute the store instruction to store the plurality of data structures into the memory.

13. The processor of claim 8, further comprising a mask register to store a bit map, wherein each bit in the bit map is to denote a masking flag for a register position in one the plurality of vector registers, wherein the logic circuit is further to execute the store instruction to, responsive to a determination that the masking flag represents a blocking status associated with the first register position of the first vector register, not store the first data item in the data structure in the memory.

14. A system-on-a-chip (SoC) comprising:
a memory;
a plurality of vector registers comprising at least a first vector register and a second vector register; and
a first execution unit, operatively coupled to the plurality of vector registers, the first execution unit comprising a first logic circuit to execute a load instruction to load, into the first vector register and the second vector register, at least a first data item and a second data item, respectively, which are located at consecutive position numbers within a data structure stored in the memory, wherein the consecutive position numbers comprise a first position number and a second position number.

15. The SoC of claim 14, further comprising a second execution unit comprising a second logic circuit to execute a store instruction to store, into the memory, the the first data item at the first position number of the data structure and the second data item at the second position number of the data structure, wherein the first data item is retrieved from the first vector register and the second data item is retrieved from the second vector register.

16. The SoC of claim 15, further comprising a mask register to store a bit map, wherein each bit in the bit map is to denote a masking flag for a register position of one of the plurality of vector registers.

17. The SoC of claim 16, wherein the logic circuit is further to execute the load instruction to, responsive to a determination that the masking flag represents a blocking status associated with a first register position of the first vector register, not load the first data item into the first vector register.

18. The SoC of claim 16, wherein the second logic circuit is further to execute the store instruction to, responsive to a determination that the masking flag represents a blocking status associated with a first register position of the first vector register, not store the first data item in the data structure in the memory.

19. A method comprising:
identifying, by a processor, a first data item and a second data item associated with an array of structures and stored at consecutive memory positions in a memory;
identifying a first vector register and a second vector register associated with the processor; and
executing a load instruction, implemented in an execution unit of the processor, to load concurrently from the memory, the first data item into a first register position of the first vector register and the second data item into a first register position of the second vector register.

20. The method of claim 19, further comprising:
prior to executing the load instruction, checking a masking flag stored in a mask register to determine whether the first register position is blocked within either of the first vector register or the second vector register; and
responsive to determining that the mask flag indicates that the first register position is blocked in the first vector register, not loading the first data item into the first vector register.

* * * * *